UNITED STATES PATENT OFFICE 2,522,838

DIAZOAMINATED DYESTUFFS

Pierre Petitcolas and Joseph Frenkiel, Rouen, France, assignors to Societe Anonyme de Matieres Colorantes et Produits Chimiques Francolor, Paris, France, a corporation of France No Drawing. Application March 10, 1947, Serial No. 733,722. In France June 12, 1939

Section 1, Public Law 690, August 8, 1946
Patent expires June 12, 1959

4 Claims. (Cl. 260—149)

The present invention relates to diazoaminated compounds obtained by condensing the 2-cyclohexylamino-5-sulphobenzoic acid and or its salts with diazo-derivatives.

We have found, according to the present invention, that the 2-cyclo-alkylamino-5-sulphobenzoic acids or their salts can be condensed in a non-acid medium with diazo derivatives for giving novel diazo-aminated compounds of the general formula:

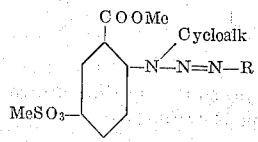

where R represents the radical of a primary aromatic amine or of an amine behaving as a primary aromatic amine in the diazotization, Cycloalk a cycloalkyl radical and Me a monovalent metal; in most cases these diazoaminated compounds can be salted out in the medium in which they are produced and possess the property of splitting even in the absence of heat in presence of diluted organic acids while regenerating the diazo compound.

Examples of specific chemical structures according to the present invention are as follows:

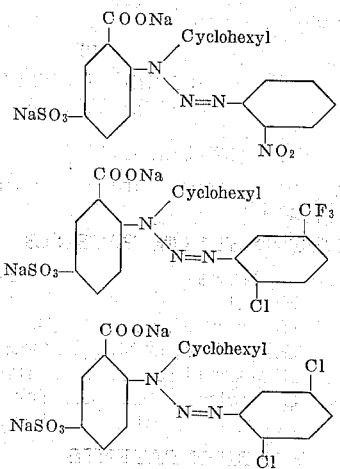

These compounds have never been described hitherto and are therefore novel commercial products. The 2-cyclo-alkylamino-5-sulphobenzoic acids employed as intermediaries can be obtained by condensing a salt of the 2-chloro-5-sulphobenzoic acid with a primary cyclo-alkylamine.

The above mentioned properties make the diazoaminated compounds obtained according to the invention particularly valuable for the formation on fibres of azo dyestuffs which are insoluble and well suited for the different printing and developing processes when mixed with the coupling components namely: printing in an alkaline medium and development through acid steaming, running through an acid bath or acid fulling and drying on the drum, printing in presence of organic bases such as the oxyethyl-diethylamine and development through neutral steaming.

For example, according to the present invention, diazoaminated derivatives of the 2-5-dichloro-aniline (which can be salted out and decompose in the absence of heat with diluted organic acids) can be produced with excellent yields. This production is of a high technical interest. Indeed, dichloraniline is a part of the composition of numerous mixtures for the printing industry and more particularly of mixtures with arylides of the betahydroxynaphthoic acid, substantive acetoacetylated derivatives and the like. Hitherto there have been used in practice, diazoaminated combinations of dichloroaniline with anthranilic-4-sulphonic acid and with N-ethyl-anthranilic-5-sulphonic acid. The first of these combinations is practically not attacked in the absence of heat by diluted organic acids; in the presence of heat its splitting up into diazo and stabilizer is incomplete. The second combination offers the advantage of splitting in the absence of heat with diluted organic acids but, again, the separation through salting out is nearly impossible, its solubility being enormous even in a saline medium; one must resort to evaporation up to dryness and to alcoholic extraction. These various inconveniences are avoided by the use of the diazoaminated combinations of dichloraniline obtained according to the invention.

Moreover, the use in the commercial practice of diazotizable bases containing in their molecule one or more strongly electro-negative groupings such as NO₂—, SO₂R—

and the like sets particular problems regarding their use in the state of diazoaminated combinations. Most of the stabilizers which have been used hitherto, as, for example, the anthranilic-4- and -5-sulphonic acids, the sarcosine, etc., give combinations which are decomposed with too much difficulty by the diluted organic acids even in the presence of heat. Under these conditions use was made of the anthranilic-5-sulphonic-N- alkylated acids which permit the use of a certain number of diazotizable bases, which therefore were practically unusable in the state of diazoaminated combinations. These anthranilic-5-sulphonic-N-alkylated acids are, however, still insufficient in the case of the O-nitrated anilines and generally of the aromatic amines ortho-substituted by strongly electro-negative groups. Now, by using the 2-cyclo-alkylamino-5-sulphobenzoic acids with such bases, according to the invention, diazoaminated combinations are obtained which can readily be decomposed by the diluted organic acids at a moderate temperature.

Furthermore, the fact that these above mentioned derivatives can split in the absence of heat, in presence of diluted organic acids, prevents the destructive action of hot diluted acids on the steaming plants.

The following are non limitative examples:

*Example I*

104 g. of monosodic salt of the 2-chloro-5-sulphobenzoic acid are dissolved in an alkaline solution made with 200 cc. of water and 42 cc. of caustic soda of 35° Bé. The neutrality of the solution is checked on phenolphthalein and 43 g. of calcinated $Na_2CO_3$, 44 g. of cyclo-hexylamine and 1 g. of copper powder are added. The solution is heated during six hours in the autoclave at a temperature of 120–140° C. After cooling, the solution which is green in color is heated with a quantity of sodium sulphide sufficient to remove the copper. The filtered solution is evaporated up to half its volume and precipitated by means of hydrochloric acid. The 2-cyclohexylamino-5-sulphobenzoic acid is filtered, pressed out and dried.

*Example II*

14 g. of O. nitraniline are mixed into a paste with 14 cc. of sodium nitrite of 50% and 30 cc. of water; this paste is poured into a mixture of 30 cc. of HCl of 20° Bé. and 50 g. of ice while energetically stirring; after stirring one hour the diazo solution is filtered and slowly poured while stirring well into a solution containing 0.12 mol. of 2 cyclo-hexylamino-5-sulphobenzoic acid obtained as above, 100 cc. of water and the quantity of caustic soda which is necessary for obtaining the neutrality of phenolphthalein. This solution is maintained at about 0° C. by a freezing mixture and the acidity introduced by the diazo solution is neutralized progressively as the solution is poured by means of sodium bicarbonate (about 25 g.). When the diazo has completely disappeared the diazo-amino combination is alkalinized with caustic soda and salted out up to saturation, the said combination precipitating in the form of fine silky-lemon-yellow needles.

*Example III*

12 g. of hydrochloride of I-amino.2-chloro.5-trifluoro-methylbenzene are mixed into a paste in 18 cc. of concentrated HCl and 50 g. of comminuted ice. The mixture is poured under liquid while energetically stirring and adding 8 cc. of a solution of $NaNO_2$ of 50% by volume. After stirring one hour when all the hydrochloride has disappeared the diazo solution is filtered and poured into a solution made as in the preceding example with 0.06 mol. of 2-cyclohexylamino-5-sulphobenzoic acid. The solution is neutralized with sodium bicarbonate progressively and when all the diazo has disappeared it is alkalinized with caustic soda and salted out up to saturation. The diazo-amino combination separates with good yields and precipitates in the form of fine scarcely yellowish flakes; being readily soluble in water it is decomposed with a great facility even under the action of very weak acids.

We claim:

1. As a new product, a diazoamino compound of the general formula:

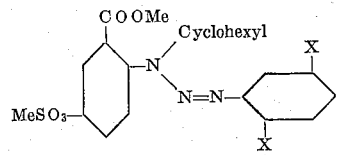

in which one X stands for a member of the group consisting of the Cl, $NO_2$ and $CF_3$ groups, the other X stands for a member of the group consisting of the hydrogen and chlorine atoms, and Me stands for an alkaline metal.

2. As a new product, the diazoamino compound of the following formula:

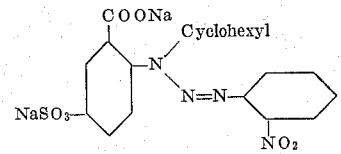

3. As a new product the diazoamino compound of the following formula:

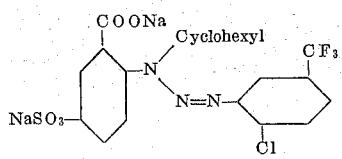

4. As a new product the diazoamino compound of the following formula:

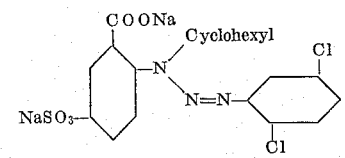

PIERRE PETITCOLAS.
JOSEPH FRENKIEL.

REFERENCES CITED

The following references are of record in the file of this patent:

UNITED STATES PATENTS

| Number | Name | Date |
|---|---|---|
| 1,858,623 | Hentrich et al. | May 17, 1932 |
| 1,882,561 | Haller et al. | Oct. 11, 1932 |
| 1,882,562 | Glietenberg et al. | Oct. 11, 1932 |
| 2,168,800 | Kracker et al. | Aug. 8, 1939 |
| 2,232,405 | Schmelzer | Feb. 18, 1941 |
| 2,316,809 | Petitcolas et al. | Apr. 20, 1943 |

FOREIGN PATENTS

| Number | Country | Date |
|---|---|---|
| 860,132 | France | Sept. 24, 1940 |